United States Patent
Luettge

(10) Patent No.: US 11,705,793 B2
(45) Date of Patent: Jul. 18, 2023

(54) METHOD AND DEVICE FOR PRODUCING AN ARRANGEMENT OF COIL ELEMENTS FOR A PLUG-IN COIL OF AN ELECTRIC MACHINE

(71) Applicant: Aumann AG, Beelen (DE)

(72) Inventor: Wolfgang Luettge, Hameln (DE)

(73) Assignee: Aumann AG, Beelen (DE)

(*) Notice: Subject to any disclaimer, the term of this patent is extended or adjusted under 35 U.S.C. 154(b) by 764 days.

(21) Appl. No.: 16/561,583

(22) Filed: Sep. 5, 2019

(65) Prior Publication Data

US 2020/0083761 A1 Mar. 12, 2020

(51) Int. Cl.
| | |
|---|---|
| H02K 15/06 | (2006.01) |
| H02K 15/04 | (2006.01) |
| H01F 41/082 | (2016.01) |
| H02K 1/08 | (2006.01) |
| H02K 15/00 | (2006.01) |

(52) U.S. Cl.
CPC ......... *H02K 15/064* (2013.01); *H01F 41/082* (2016.01); *H02K 1/08* (2013.01); *H02K 15/0056* (2013.01); *H02K 15/0414* (2013.01)

(58) Field of Classification Search
CPC .......................... H02K 15/064; H02K 15/0414
See application file for complete search history.

(56) References Cited

U.S. PATENT DOCUMENTS

| | | | | |
|---|---|---|---|---|
| 7,941,910 B2* | 5/2011 | Guercioni | .......... | H02K 15/0428 |
| | | | | 29/596 |
| 8,832,925 B2* | 9/2014 | Mishina | ............... | H02K 15/067 |
| | | | | 29/596 |
| 2016/0233749 A1 | 8/2016 | Ueno et al. | | |

FOREIGN PATENT DOCUMENTS

| | | |
|---|---|---|
| DE | 102016221355 A1 | 5/2018 |
| GB | 644761 A | 10/1950 |
| JP | 2004072839 A | 3/2004 |
| WO | WO-2013153594 A1 | 10/2013 |
| WO | WO-2018039806 A2 | 3/2018 |

* cited by examiner

*Primary Examiner* — Livius R. Cazan
(74) *Attorney, Agent, or Firm* — Harness, Dickey & Pierce, P.L.C.

(57) ABSTRACT

A method is presented for producing an arrangement of coil elements for a plug-in coil of an electric machine. The method includes providing a workpiece carrier and producing an arrangement of rod-shaped coil elements for a plug-in coil of an electric machine on the workpiece carrier, wherein the following is respectively provided for the rod-shaped coil elements: accommodating and holding the coil elements by means of a displacement device; supplying the coil element onto the workpiece carrier by means of the displacement device into an assigned proximal position on the workpiece carrier, wherein the coil elements are hereby displaced form a distal position into the assigned proximal position with respect to the workpiece carrier; and transferring the coil elements in the proximal position on the workpiece carrier from the displacement device by a gripping device, which is formed on the workpiece carrier.

11 Claims, 25 Drawing Sheets

METHOD AND DEVICE FOR PRODUCING AN ARRANGEMENT OF COIL ELEMENTS FOR A PLUG-IN COIL OF AN ELECTRIC MACHINE

CROSS REFERENCE TO RELATED APPLICATIONS

This application claims the benefit and priority of DE102018121745.5, filed Sep. 6, 2018. The entire disclosure of the above application is incorporated herein by reference.

FIELD

The invention relates to a method and a device for producing an arrangement of coil elements for a plug-in coil of an electric machine.

BACKGROUND

Such technologies are used in order to manufacture single-or multi-layer arrangements of coil elements, which are then inserted as an arrangement as a whole into a coil core so that sections of the coil elements are arranged in assigned grooves of the coil core. For example, it may hereby be provided that a closed arrangement of coil elements is produced, in particular a basket-like arrangement of coil elements, in which, for example, the single layer or the plurality of layers of the coil elements is/are arranged corresponding to the peripheral surface of a circular cylinder.

This section provides background information related to the present disclosure which is not necessarily prior art.

SUMMARY

This section provides a general summary of the disclosure, and is not a comprehensive disclosure of its full scope or all of its features.

The object of the invention is to provide a method and a device for producing an arrangement of coil elements for a plug-in coil of an electric machine, with which the coil elements may be introduced to form the arrangement in an efficient way, in particular also within the context of mass production of such arrangements of coil elements. Also, flexibility with respect to specific features of a winding, formed using the coil elements, is to be created, for example, relating to the number of conductors, number of grooves, number of layers, winding pattern, and/or coil width.

To solve this, a method and a device for producing an arrangement of coil elements for a plug-in coil of an electric machine are created according to independent claims 1 and 11. Embodiments are the subject matter of dependent sub-claims.

According to one aspect, a method for producing an arrangement of coil elements for a plug-in coil of an electric machine is created, wherein the method has the following steps: providing a workpiece carrier and producing an at least single-layer arrangement of rod-shaped coil elements for a plug-in coil of an electric machine on the workpiece carrier. The following is hereby respectively provided for the rod-shaped coil elements: accommodating and holding the coil element by means of a displacement device; supplying the coil elements onto the workpiece carrier by means of the displacement device into an assigned proximal position on the workpiece carrier, wherein the coil elements are hereby displaced from a distal position into the assigned proximal position with respect to the workpiece carrier; and transferring coil elements in the proximal position on the workpiece carrier from the displacement device by a gripping device that is formed on the workpiece carrier. After transferring the coil elements, the at least single-layer arrangement of coil elements is held on the workpiece carrier by means of the gripping device.

According to another aspect, a device is created for producing an arrangement of coil elements for a plug-in coil of an electric machine. The device has the following: a workpiece carrier, on which an at least single-layer arrangement of rod-shaped coil elements for a plug-in coil of an electric machine is producible; a displacement device which, for producing the at least single-layer arrangement of coil elements on the workpiece carrier, is configured to respectively receive and hold the coil elements and to supply the coil elements to the workpiece carrier in such a way that the coil elements are each displaced in an assigned proximal position on the workpiece carrier, wherein the coil elements are hereby displaced from a distal position into the assigned proximal position with respect to the workpiece carrier; and a gripping device which, for producing the at least single-layer arrangement of coil elements on the workpiece carrier, is configured to respectively transfer and hold the coil elements from the displacement device in the proximal position on the workpiece carrier. The gripping device is further configured to hold the at least single-layer arrangement of coil elements on the workpiece carrier after the transfer of the coil elements.

The forming of the arrangement of coil elements for the plug-in coil is facilitated in a simple and efficient way with the aid of the proposed technologies. The coil elements are each accommodated and held with the aid of the displacement device in order to then supply the same onto the workpiece carrier. The coil elements are transferred in the assigned proximal position by the gripping device, in particular each individually assigned gripping element, in order to finally hold the entire arrangement of coil elements on the workpiece carrier by means of the gripping device, so that the at least single-layer arrangement of coil elements may be delivered as a complete arrangement for further processing. Such further processing may be provided in that a transfer gripper grips the arrangement of coil elements as a whole and removes it from the workpiece carrier in order to deliver the arrangement of coil elements to another workstation, for example, for inserting sections of the coil elements into assigned grooves of a coil core for producing a plug-in coil.

The produced (premounted) arrangement may present a completely closed contour as a partial winding, or partial contours depending on the desired winding pattern. For this purpose, coil elements may be omitted as needed for subsequent assembly in the process chain, so that installation spaces are left for secondary manufacturing and assembly steps.

It may be provided that the arrangement of coil elements is produced as a self-contained arrangement of coil elements. The method may provide that an arrangement of coil elements is produced in which the at least one layer of coil elements is produced enclosing a closed circumferential surface, for example, comparable to a circumferential wall of a hollow circular cylinder.

It may be provided that steps for producing a layer of coil elements for the arrangement are repeated in order to produce a multi-layer arrangement of coil elements on the workpiece carrier.

It may be provided that individual, not self-contained arrangements are produced, which may be added to any winding pattern in upstream or downstream steps. The process is hereby independent of the number of conductors/grooves or their arrangement.

The rod-shaped coil elements may, for example, have a U-shape or be designed as so-called hairpins, I-pins, or D-pins.

The product produced does not have to satisfy any specific design demands and is therefore flexible in the configuration of the winding, in particular with respect to the winding pattern, number of conductors, and number of grooves.

The gripping device may be designed with gripping elements, which grip and hold the coil elements during transferring of the same. Mechanical and/or magnetic holding forces may act during the transferring and/or holding of the coil elements by/on the gripping device. The gripping elements may, for example, be designed with a respective gripper arm. Resiliently yieldable gripping elements may be provided in order to provide a clamping force in this way. It may thus be provided that opposite gripping elements of the gripping device are pushed elastically apart against a biasing force during the transferring of the coil elements so that the gripped section of the coil element is held by this means on the gripping device. The gripping elements may be arranged forming a V-shaped accommodation gap, which expands on the side opposite the coil element in order to support a lighter insertion of the coil element between the gripping elements. Sections of the gripping device, in particular the gripping elements which come into contact with the coil elements during the transferring of the same, may have a non-slip surface. For example, a covering made from a rubber or a plastic material may be used here.

The gripping device may be displaced between a retracted and an extended position, in which the transferring of the coil elements is carried out, for transferring the coil elements. It may hereby be provided that the assigned gripping element is displaced from a retracted into an extended position for transferring the coil elements. The displacement between the retracted and the extended position may be carried out in a radial direction with respect to the workpiece carrier axis. For example, the extension may be carried out from radially inward to radially outward. The displacement of the gripping device, in particular of gripping elements of the gripping device, between the retracted and the extended position may, for example, prevent the gripping device from impeding the supplying of coil elements to the workpiece carrier with the aid of the displacement device. Only when the coil element is arranged in the assigned proximal position on the workpiece carrier, the assigned gripping device is extended in order to transfer the coil element. In general, it may be provided that, after first supplying the coil element onto the workpiece carrier in the proximal position of the coil elements on the workpiece carrier by means of the displacement device, local displacements or relocations of the coil element in the proximal position may be carried out in order to optimize its positioning. It may hereby be provided that the gripping device only transfers the coil element after the additional local displacement. The relative movement between coil element and gripping device during the transfer may be carried out partially or completely in the radial direction with respect to the workpiece carrier axis, in particular in that the displacement of the gripping device is carried out in the radial direction between the retracted and the extended position. In this process, there exists the possibility for integrating secondary assembly and alignment processes.

The gripping device may be displaced during displacement at least in sections into an opening of a wall section of the workpiece carrier. The wall section with the opening may, for example, be part of a housing of the workpiece carrier. In the retracted position, the gripping device is arranged partially or completely behind the opening of the wall section.

The gripping device may be displaced between the retracted and the extended position by means of an actuating device which functionally couples thereon and which is arranged on the workpiece carrier. The actuating device functionally couples to the gripping device in such a way that this is extended for transferring the coil elements. It may hereby be provided that an actuating element of the actuating device, for example, a tappet or slider, is axially displaced with respect to the workpiece carrier axis in order to cause the extension of the gripping device in the radial direction. It may be provided that an oblique surface on the actuating element interacts with the gripping device, in particular the gripping elements, in order to move the same into the extended position during the axial advance of the actuating element radially outward. A corresponding oblique surface may be provided on the gripping device. The actuating device may be arranged in a housing of the workpiece carrier. Other mechanisms may be provided in order to cause a displacement of the gripping device between the retracted and the extended positions. For example, a section of the gripping device may be arranged in a field of an electric coil in order to control a displacement of the gripping device by means of a coil controller.

The gripping device may have a locking device, which is configured to prevent an unintentional loosening of the coil elements after the transfer. The locking device may have end-side projections at the distal end of the gripping device, in particular on the distal end of the gripping elements, which is arranged opposite the coil elements before the transferring of the same, said projections preventing an unintentional loosening of the coil elements. For example, the projections may be provided on adjacent gripping elements opposite each other.

During the transfer of the coil element from the displacement device, a relative movement between the coil element and the gripping device in a direction radial to the workpiece carrier axis may be carried out by the assigned gripping device. The workpiece carrier axis may be a longitudinal axis, in particular a vertical axis of the workpiece carrier.

During the supply of the coil element to the workpiece carrier, the displacement device with the coil element held thereon may be displaced in the direction radial to the workpiece carrier axis in order to displace the coil element into the proximal position on the workpiece carrier. A radial supply movement is carried out in this way.

After the displacement into the proximal position, the coil element may be pivoted about an axis of rotation in the same position. The coil element may hereby be rotated about an axis of rotation, which extends substantially parallel to the workpiece carrier axis (axial axis). The coil element is thus transferred from an initial position into a rotated position. It may hereby be provided that one arm of the coil element is held on the workpiece carrier and an opposite arm of the coil element is displaced by means of rotation, namely out of an initial distal position with respect to the workpiece carrier into a proximal position.

After the transfer by the gripping device, the coil element may be pressed back into the same by means of pressing device. A contact pressure slider may be provided for this. The pressing device may provide a pressure force in the radial direction with respect to the workpiece carrier axis in order to apply said force to the coil element. Alternatively or additionally, the contact pressure slider may be provided in order to press the coil element in the direction of the gripping device or opposite the same for the transfer from the displacement device.

In connection with the device for producing the arrangement of coil elements for the plug-in coil, the embodiments previously explained in conjunction with the method may be correspondingly provided for the plug-in coil.

The device may have a surrounding arrangement of gripping devices on the workpiece carrier for the coil elements. A respective displacement device for supplying the coil elements may be assigned to one or a plurality of the gripping devices. In one embodiment, a respective displacement device is assigned to each gripping device, which for its part may have gripping elements. The arrangement of the gripping devices and the displacement devices may be continuously formed along the periphery of the workpiece carrier.

A plurality of gripping devices may be provided on the workpiece carrier for gripping and holding a single coil element, in particular two gripping devices which simultaneously transfer the coil element from the displacement device and then hold it. For example, two gripping devices, which mutually transfer and hold a coil element, may be arranged one above the other. To carry out the transfer, the gripping devices, which mutually hold a coil element, may be simultaneously actuatable by means of the actuating device. For this purpose, actuating elements for the actuating device may be provided, for example, arranged one above the other on the workpiece carrier, for example, sliders with an oblique surface, in order to extend the gripping devices in the radial direction. Alternatively, the gripping devices assigned to a coil element may also transfer the coil element in a time-staggered way.

It may be provided with respect to the displacement device, with which the coil elements are respectively accommodated and held for supplying to the workpiece carrier, that the coil element is inserted or adjusted with at least one arm or arm section into a recess, for example, a tubular recess, in which the arm section of the coil element is detachably arranged. To form the arrangement of coil elements, the coil element, with the arm section standing in the recess, is supplied to the workpiece carrier. If a holding force is designed for the coil element on the workpiece carrier, then the displacement device may be retracted from the coil element so that the arm section of the coil element moves out of the recess. The displacement device may be subsequently removed from the workpiece carrier.

The arrangement of the arm section of the coil element in the recess of the displacement device facilitates the rotation of the coil element after this has been supplied to the workpiece carrier.

If the coil element is held with a first holding force, for example, with the aid of the contact pressure slider, on the workpiece carrier after release from the displacement device, then said contact pressure slider may be used in order to supplementally or additionally press the coil element against the workpiece carrier, for example against the gripping device, after the removal of the displacement device, in particular after the release of the arm section of the coil element from the recess of the displacement device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
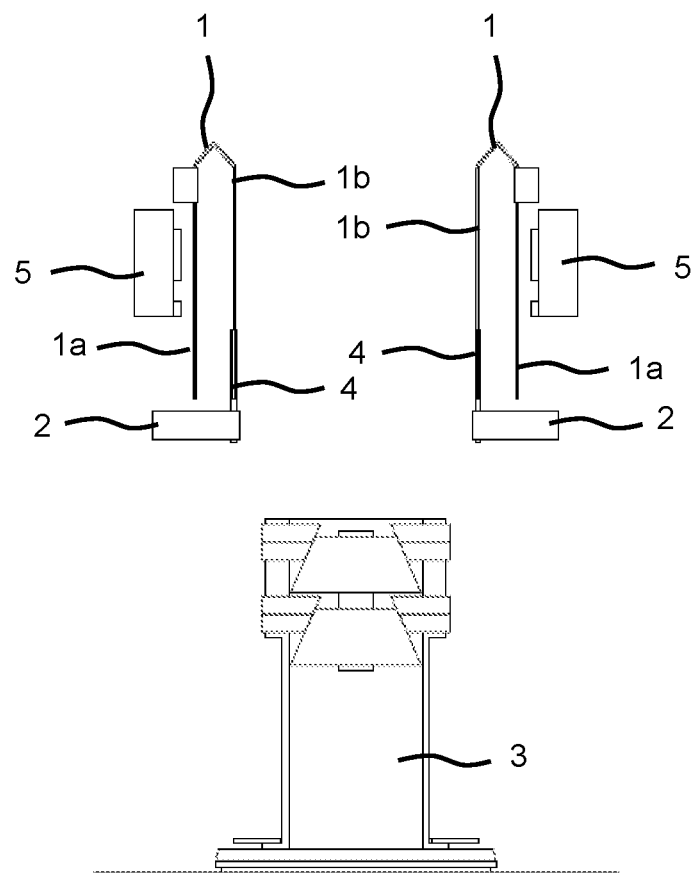
FIG. 1A-1B are a schematic depiction of a device for producing an arrangement of coil elements for a plug-in coil of an electric machine, wherein a respective coil element is accommodated with the aid of a displacement device.
Figure 1B:
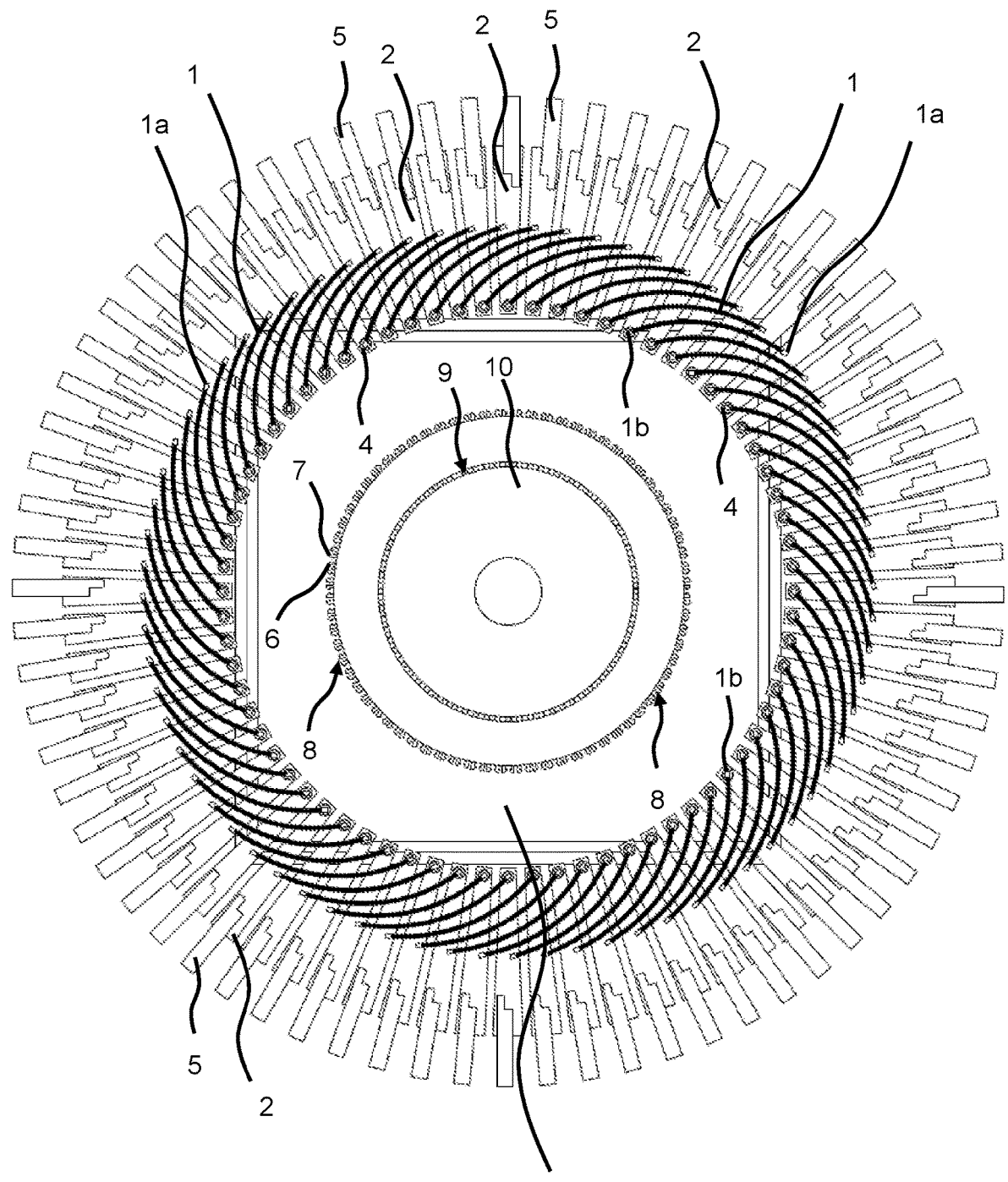

FIGS. 1A-1B show a schematic depiction of a device for producing an arrangement of coil elements for a plug-in coil of an electric machine. In FIGS. 1A-1B, as also in the other figures, the device is depicted in front and top views.

Figure 2A:
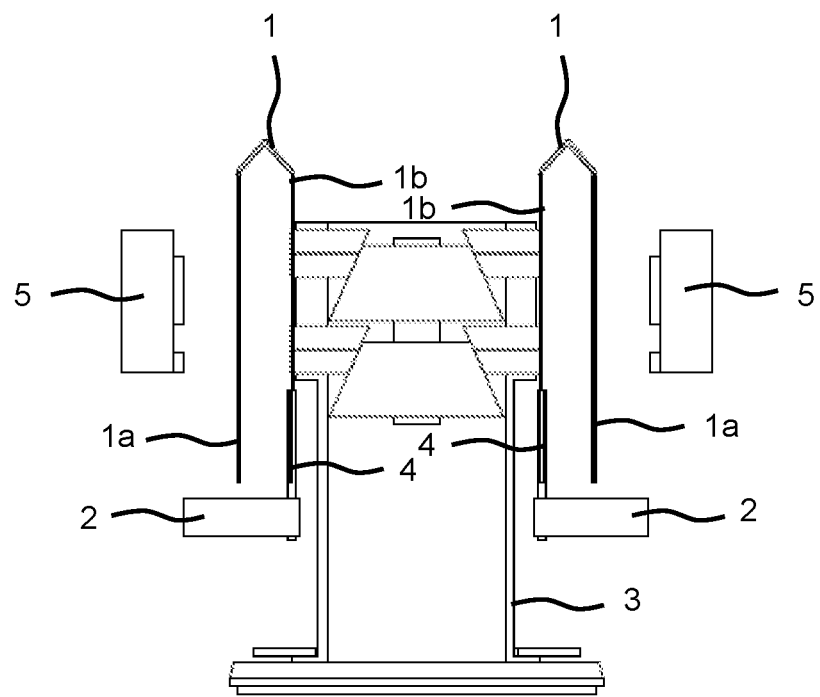
FIG. 2A-2B are a schematic depiction of the device from FIG. 1, wherein the coil elements are each supplied onto the workpiece carrier.
Figure 2B:
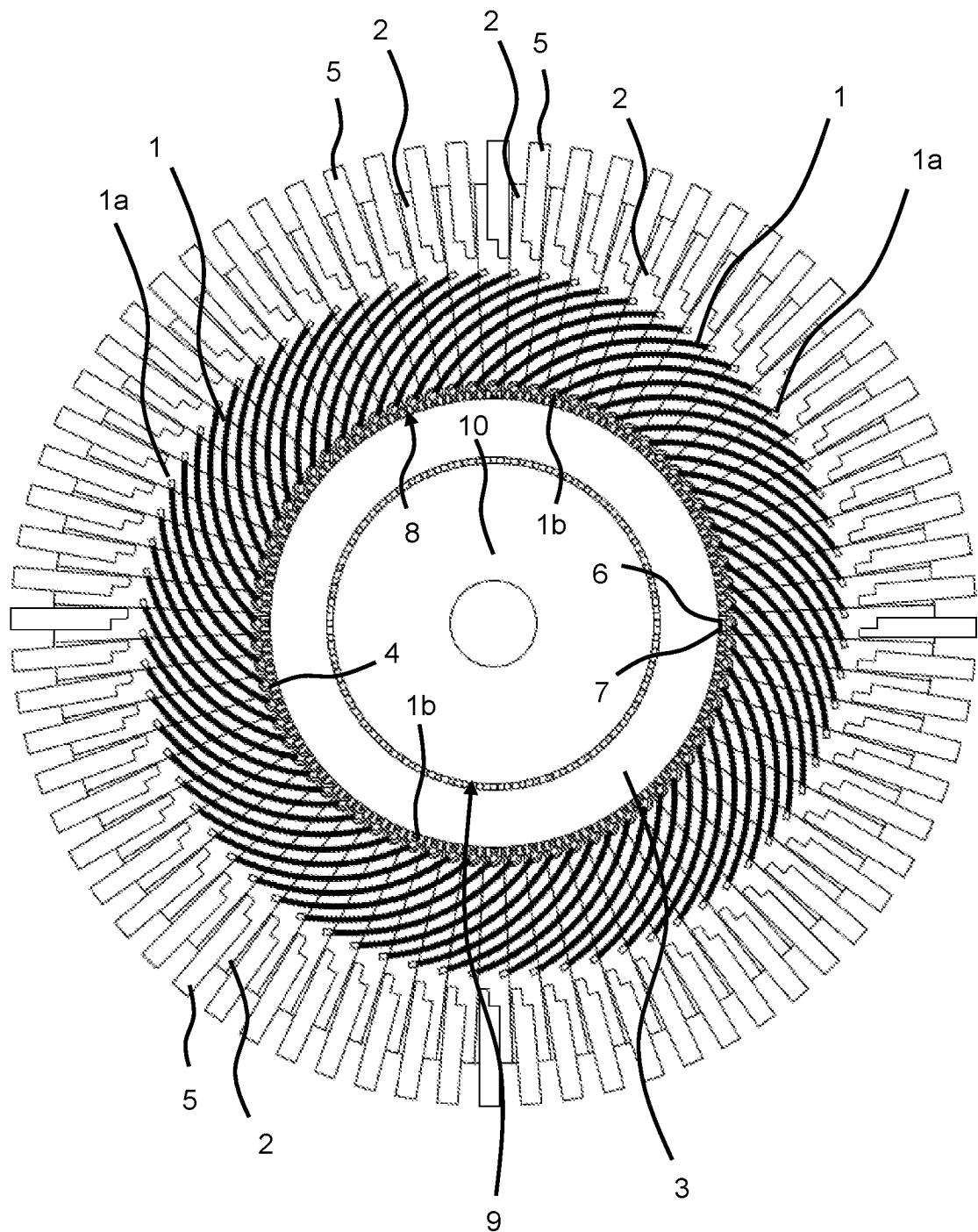

Coil elements 1 are respectively accommodated and held with the aid of an assigned dis-placement device 2 in order to supply the coil elements 1 to a workpiece carrier 3 by means of the displacement device 2, which is shown in FIGS. 2A-2B. The displacement device 2 with the coil element 1 is hereby displaced from a distal position into the proximal position on the workpiece carrier 3 shown in FIGS. 2A-2B. The distal position is elevated with respect to the work-piece carrier 3 according to the example shown in FIGS. 1A-1B.

In the embodiment depicted in FIGS. 1A-1B and 2A-2B, the displacement device 2 with the coil elements 1 is then initially lowered to the height of the workpiece carrier 3, and then supplied in the radial direction with respect to a workpiece carrier axis extending through workpiece carrier 3. Alternatively, the workpiece carrier 3 may be lifted. In other embodiments, it may be provided that the coil element 1 is already accommodated by the displacement device 2 at the height of the workpiece carrier 3 and is accommodated opposite the same, so that only a supply movement in a radial movement takes place.

According to the exemplarily embodiment shown, an arrangement of displacement devices 2, formed continuously surrounding the workpiece carrier 3, is provided, each of which accommodates a coil element 1 and supplies the same to the workpiece carrier 3 during operation. This may be carried out for all displacement devices 2 simultaneously or in a time-delayed way for individual displacement devices 2 or groups thereof.

The coil elements 1 are designed in the embodiment shown as a so-called hairpin, which has arms 1a, 1b. Other rod-shaped coil elements may be provided in order to produce the arrangement of coil elements, for example, rod-shaped coil elements with a U-shape.

Figure 3A:
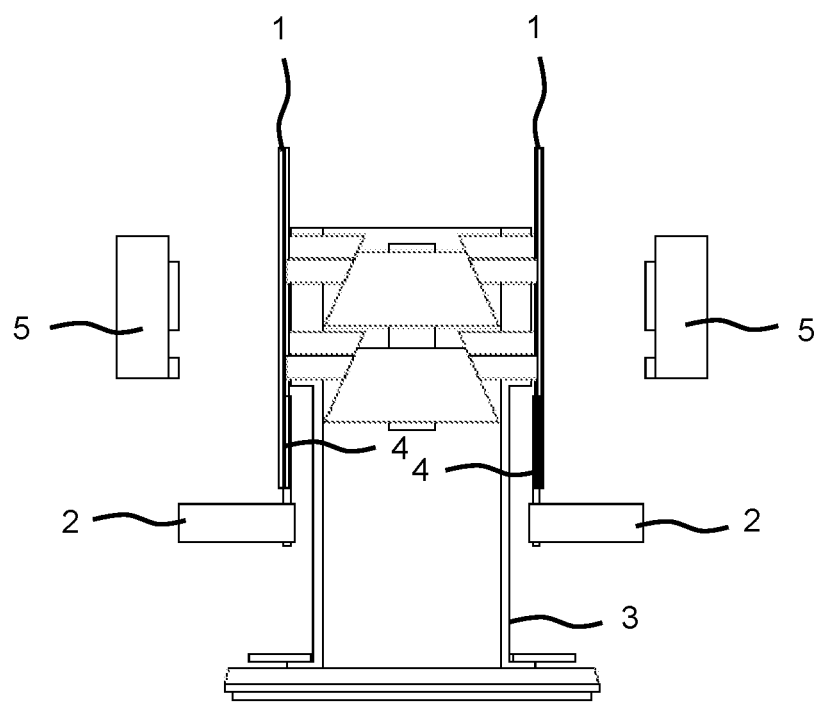
FIG. 3A-3B are a schematic depiction of the device from FIG. 1, wherein the coil elements, still accommodated on the displacement device, are rotated.
Figure 3B:
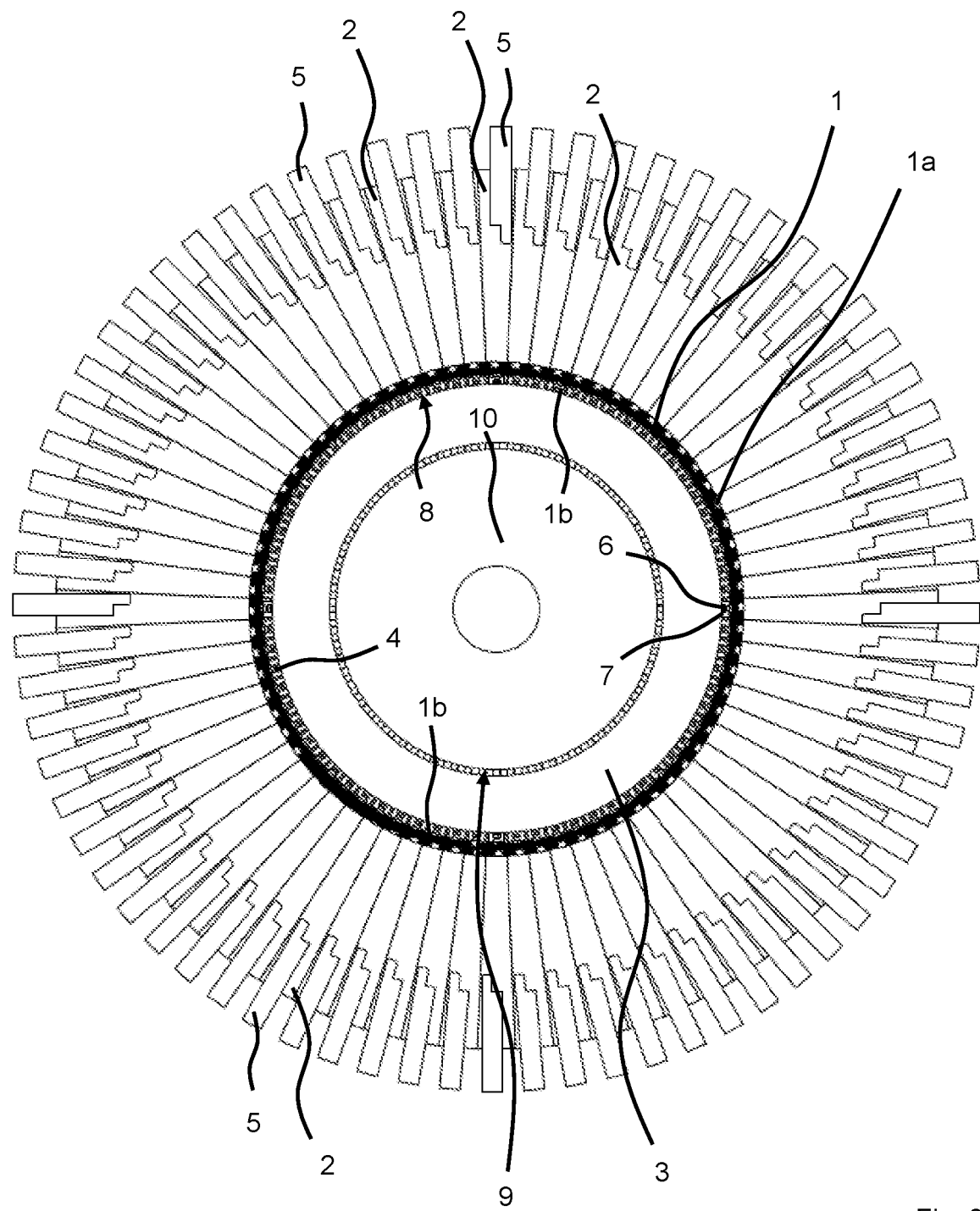

According to FIGS. 1A-1B and 2A-2B, an arm 1b of the coil element 1 is arranged in a recess 4 of the displacement device 2. In the embodiment shown, the recess 4 is designed as tubular, for example, as a sleeve with a bottom. The arm 1b of the coil element 1 is inserted or set into the recess 4 in such a way that the coil element 1 may be rotated after being supplied to the workpiece carrier 3, as this is schematically depicted in FIGS. 3A-3B. The arm 1a of the coil element 1 is hereby displaced from an initial distal position into a proximal position with respect to the workpiece carrier 3, said displacement being carried by means of the rotational movement. The arm 1b of the coil element 1 in the recess 4 forms an axis of rotation about which the turning or rotation is carried out. The rotation is carried out with the aid of an actuating means (not shown) which may exert a desired rotational force on the coil element 1.

Figure 4A:
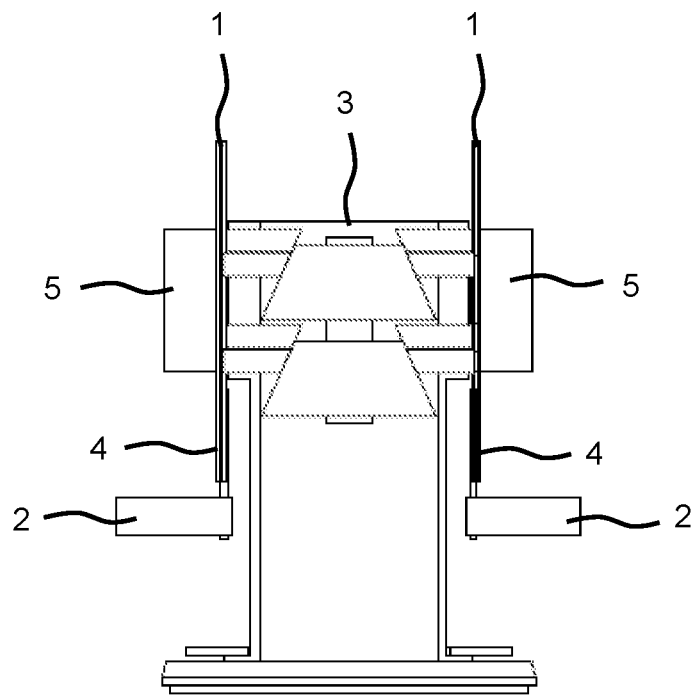
FIG. 4A-4B are a schematic depiction of the device from FIG. 1, wherein the coil elements on the workpiece carrier are pressed against the workpiece carrier by means of a respective slider and thus held thereon.
Figure 4B:
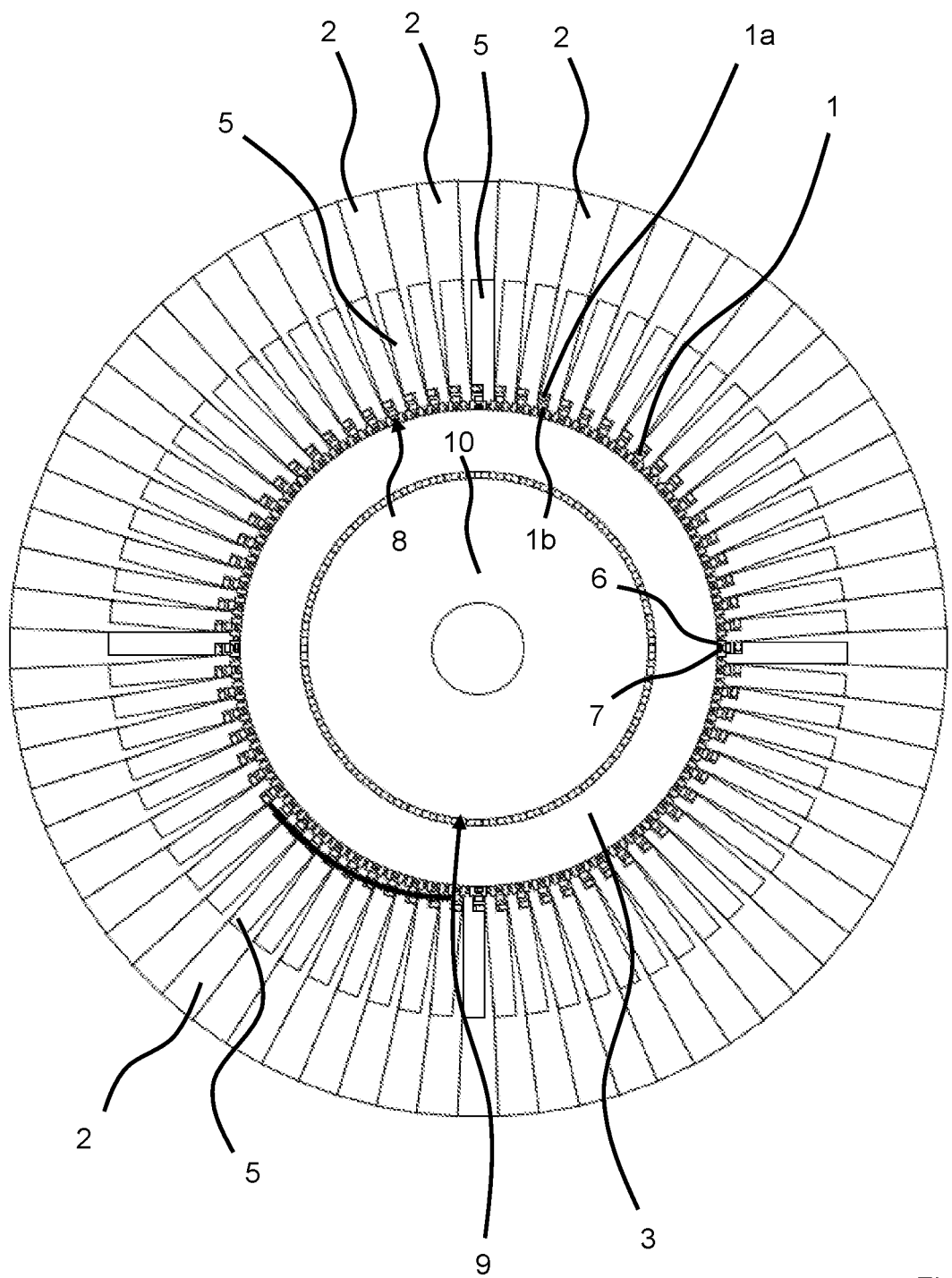

After the rotation, the coil element 1 is pressed with the aid of a pressing device 5, which is designed as a slider in the embodiment shown, against the workpiece carrier 3 in order to localize the coil element 1 thereupon and to hold it there. For this purpose, the pressing device 5 is advanced toward the workpiece carrier 3 (see FIGS. 4A-4B).

Figure 5A:
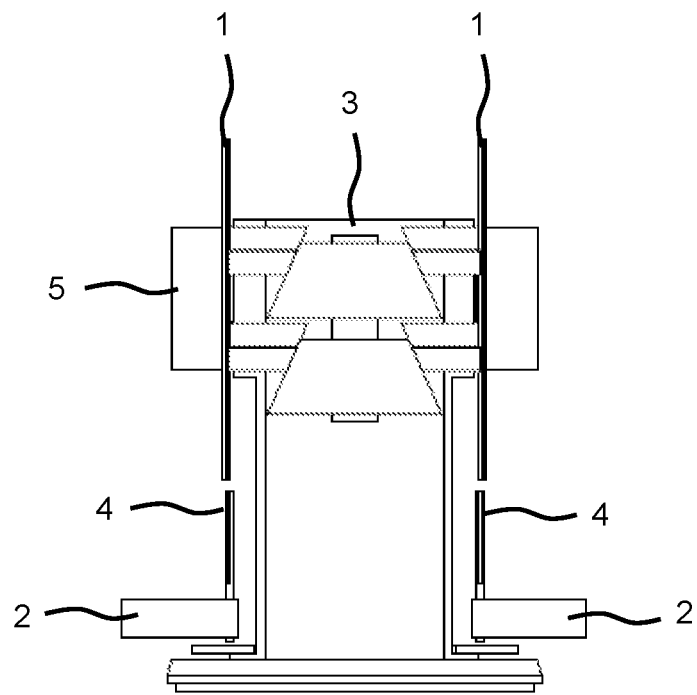
FIG. 5A-5B are a schematic depiction of the device from FIG. 1, wherein the coil elements are released from the displacement device.
Figure 5B:
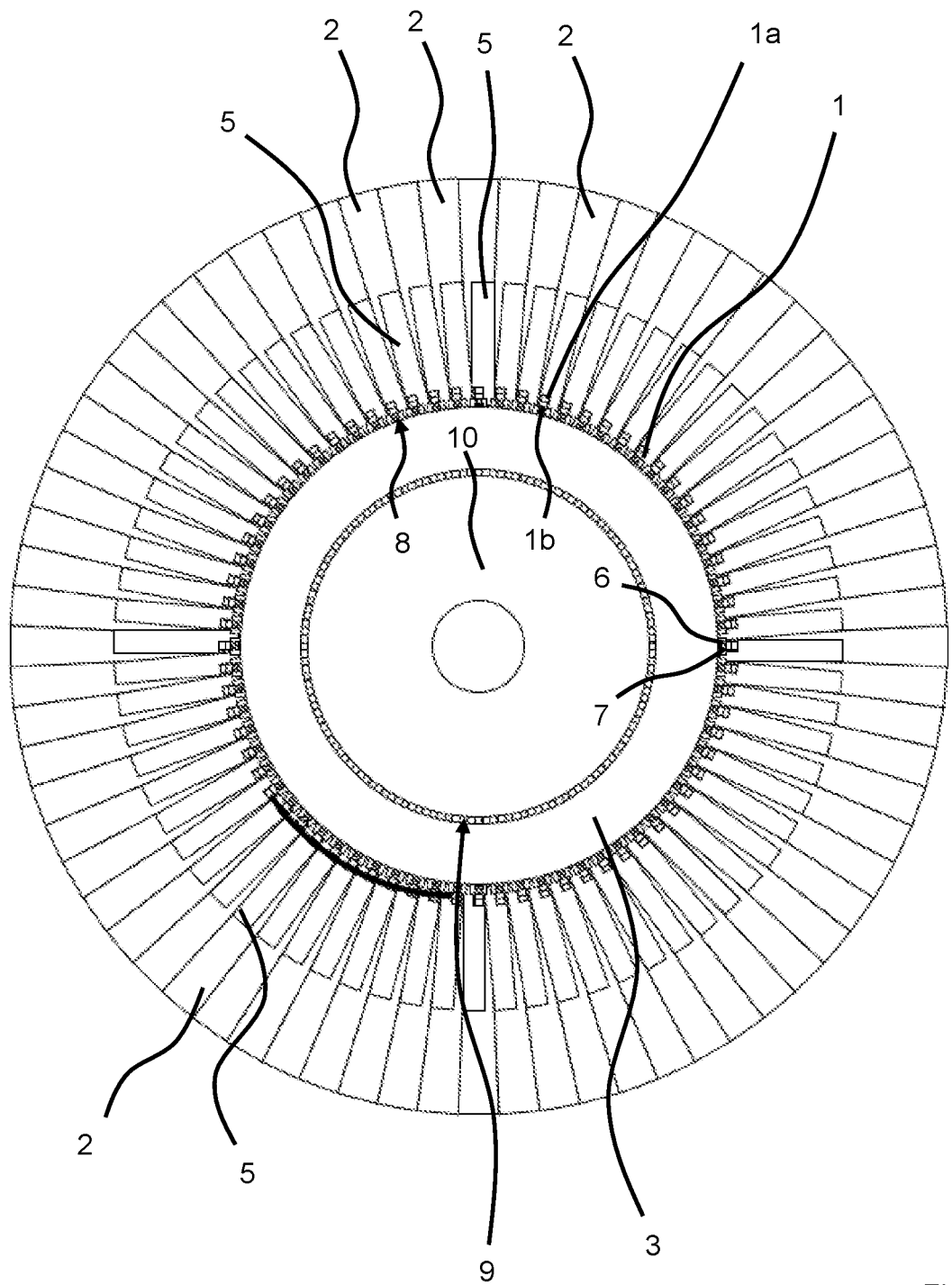

Afterwards, the coil element 1 may be released from the displacement device 2, as shown in FIGS. 5A-5B. The displacement device 2 with the recess 4 is moved downward in order to release the arm 1b of the coil element 1 from the recess 4.

Figure 6A:
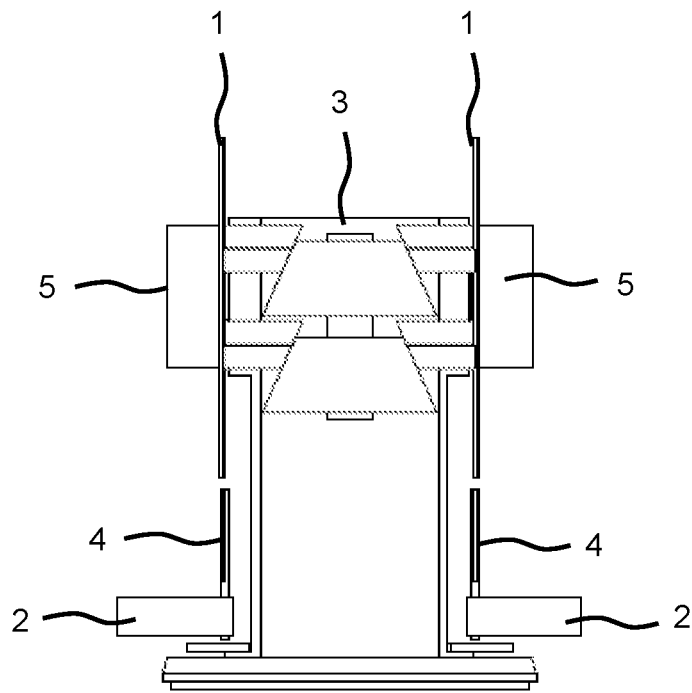
FIG. 6A-6B are a schematic depiction of the device from FIG. 1, wherein the coil elements are pressed back against the workpiece carrier by means of the sliders.
Figure 6B:
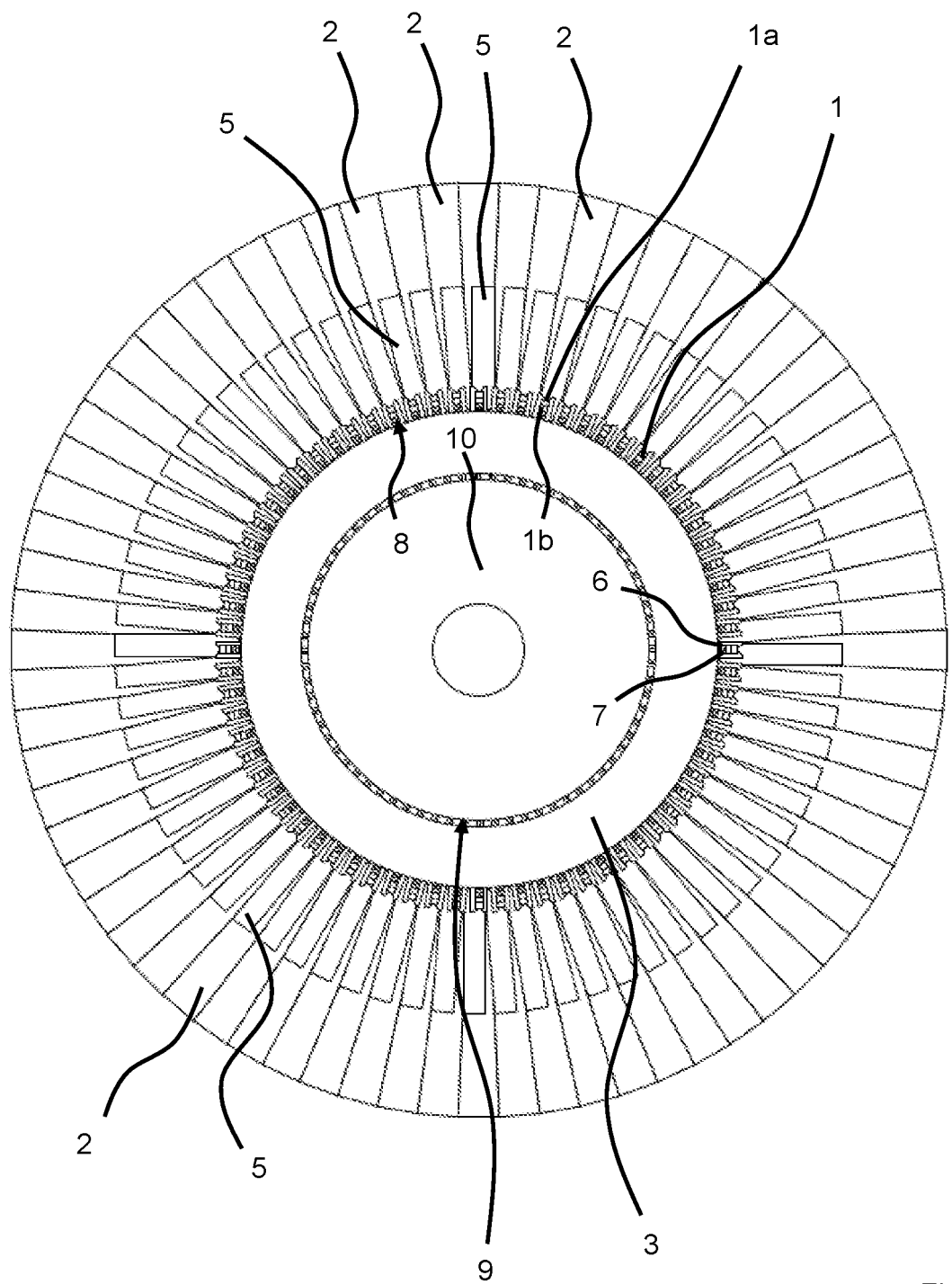

According to FIGS. 6A-6B, a settling, pressing further, or adjustment of the coil element 1 against the workpiece carrier 3 is carried out by means of the pressing device 5, said coil element 1 is hereby (supplementally) pressed against gripping elements 6, 7 of a gripping device 8, which is assigned to the respective coil element 1 on the workpiece carrier 3 and functions for gripping and holding the coil elements 1. In the depiction in FIGS. 6A-6B, the gripping elements 6, 7 are still in a retracted position in such a way that the coil element 1 may be held on the workpiece carrier 3 by means of the pressing device 5 between distal ends 6a, 7a of the gripping elements 6, 7 and the pressing device 5.

According to the embodiment shown, two gripping devices 8 are assigned to each coil element 1, wherein the two gripping devices 8 are arranged one above the other and both respectively together grip and then hold the coil element 1.

Figure 7A:
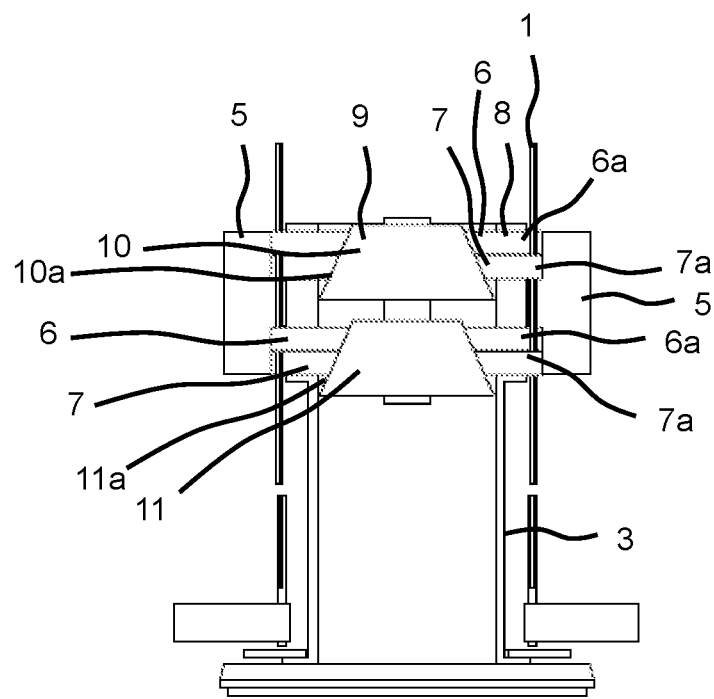
FIG. 7A-7B are a schematic depiction of the device from FIG. 1, wherein the coil elements are respectively gripped on the workpiece carrier using two gripping devices arranged one over the other and held on the workpiece carrier by the same.
Figure 7B:
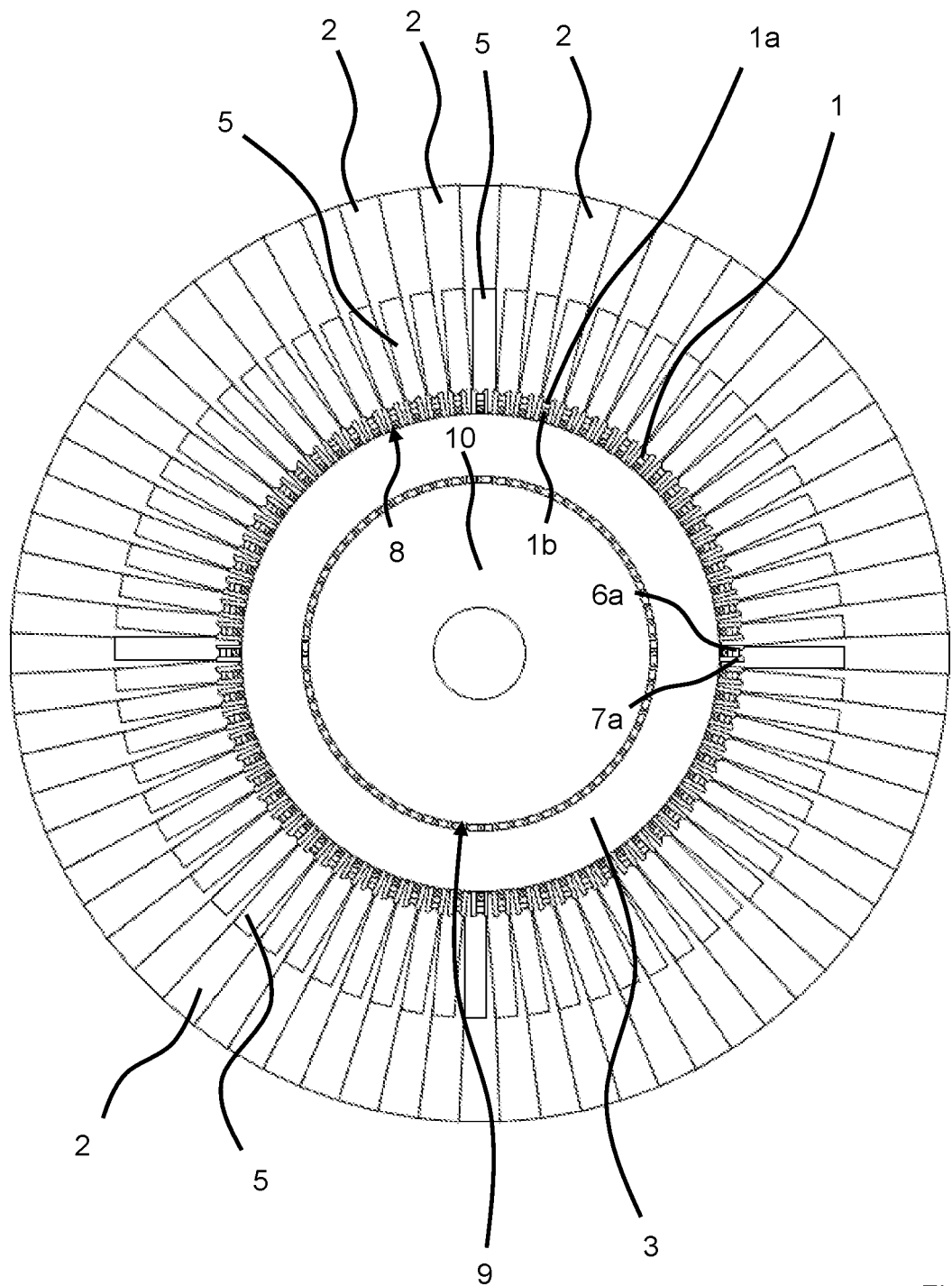

According to FIGS. 7A-7B, the gripping elements 6, 7 are displaced into an extended position by means of a movement radially outward in order to respectively transfer, thus grip and hold, the coil element 1. For this purpose, an actuating device 9 on the workpiece carrier 3 is used, which has actuating elements 10, 11 with respective oblique surfaces 10a, 11a in the embodiment shown. The displacement of the actuating elements 10, 11 in axial direction causes an outward extension of the respective gripping elements 6, 7, each of which for example having a gripping arm, in order to grip respective coil element 1. The coil element 1 is hereby respectively clamped and held between the gripping elements 6, 7. The gripping devices arranged one above the other are thus simultaneously actuated.

Figure 8A:
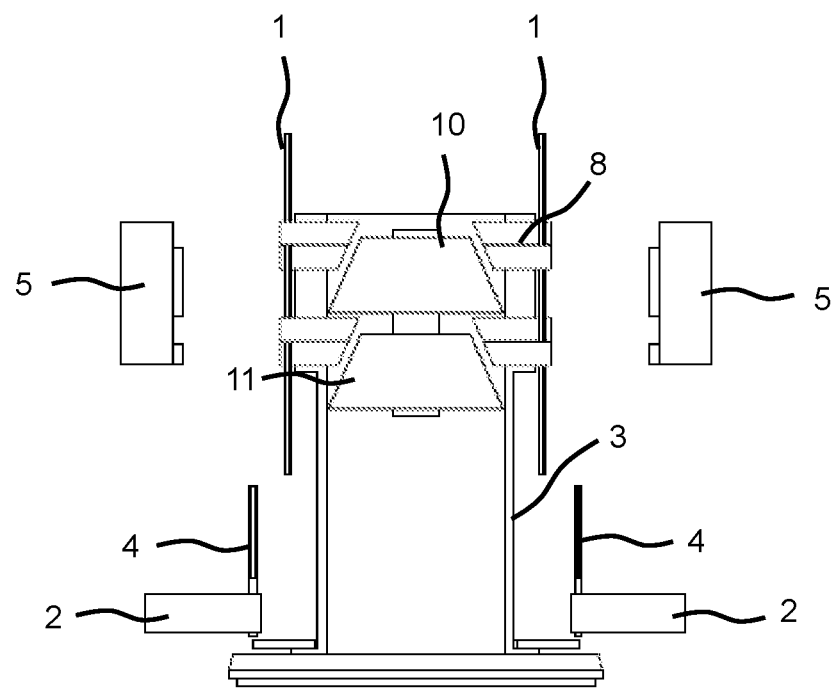
FIG. 8A-8B are a schematic depiction of the device from FIG. 1, wherein the displacement device and the sliders are moved away from the workpiece carrier.
Figure 8B:
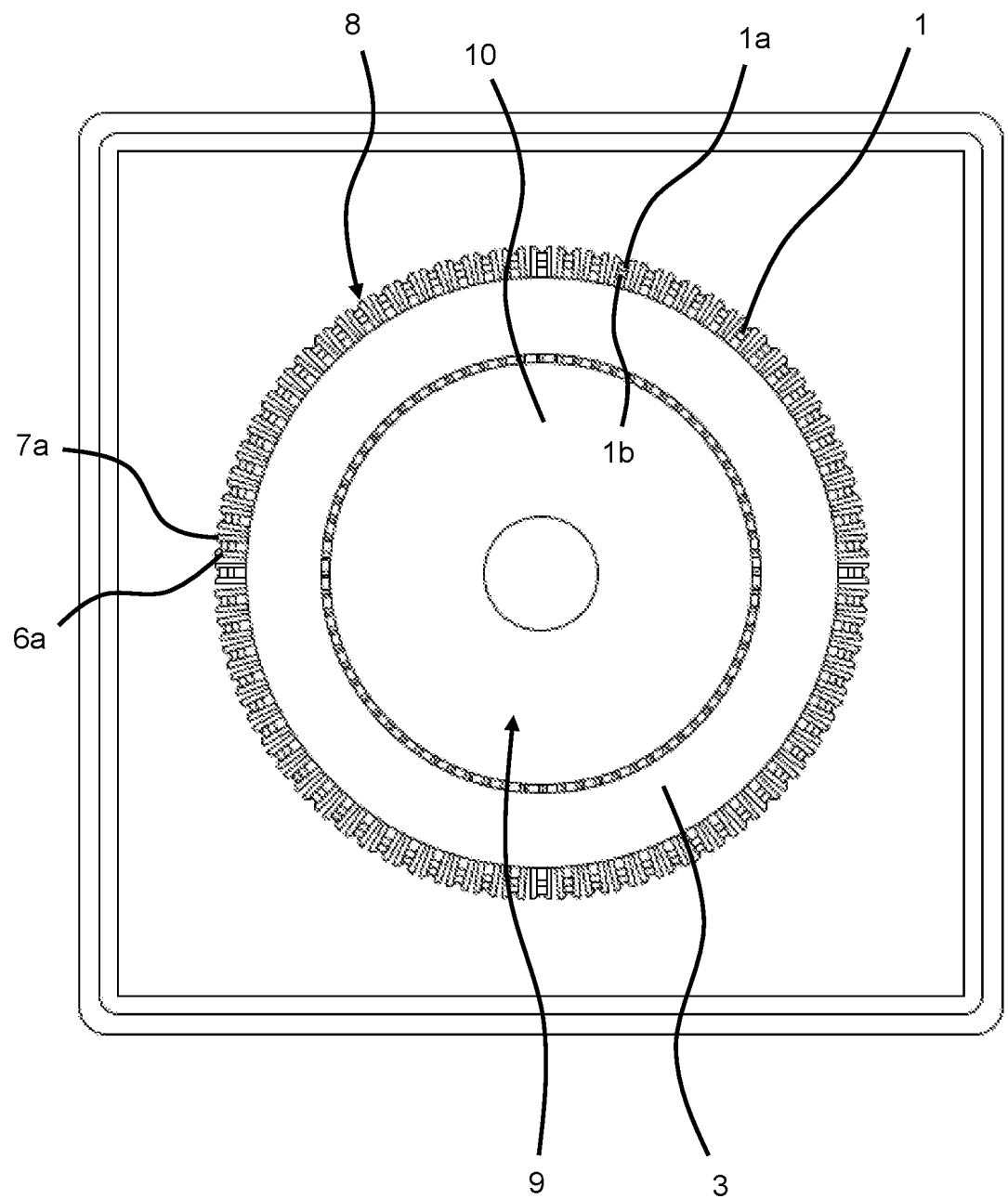

The pressing device 5 may subsequently be released from the workpiece carrier 3 according to FIGS. 8A-8B. The coil element 1 is held on the workpiece carrier 3 by means of the respective gripping elements 6, 7 of the gripping device 8.

Figure 9A:
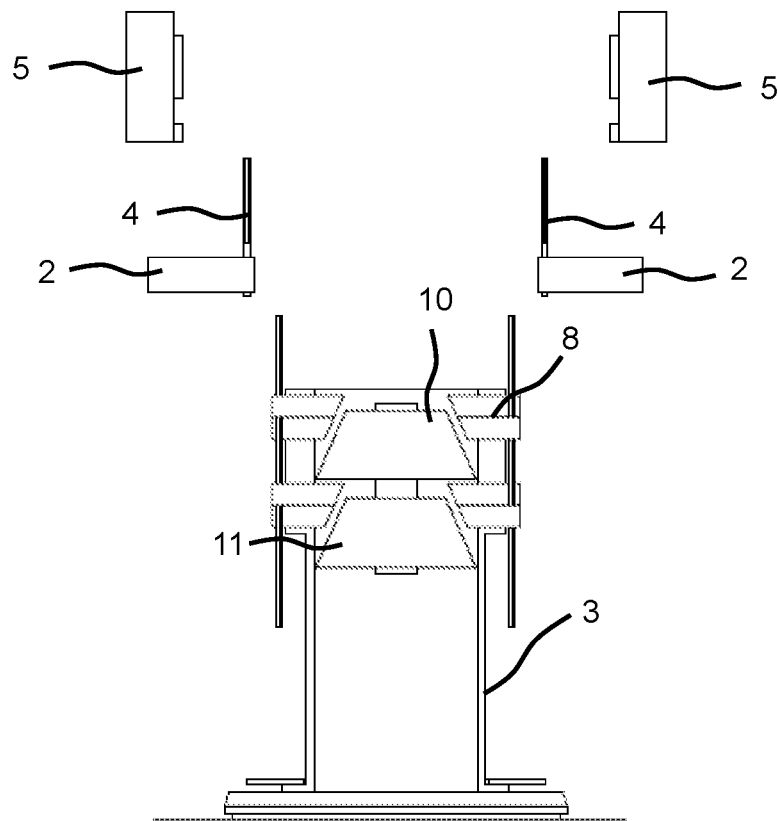
FIG. 9A-9B are a schematic depiction of the device from FIG. 1, wherein the displacement device and the sliders are moved farther away from the workpiece carrier, in particular into an elevated position with respect to the workpiece carrier.
Figure 9B:
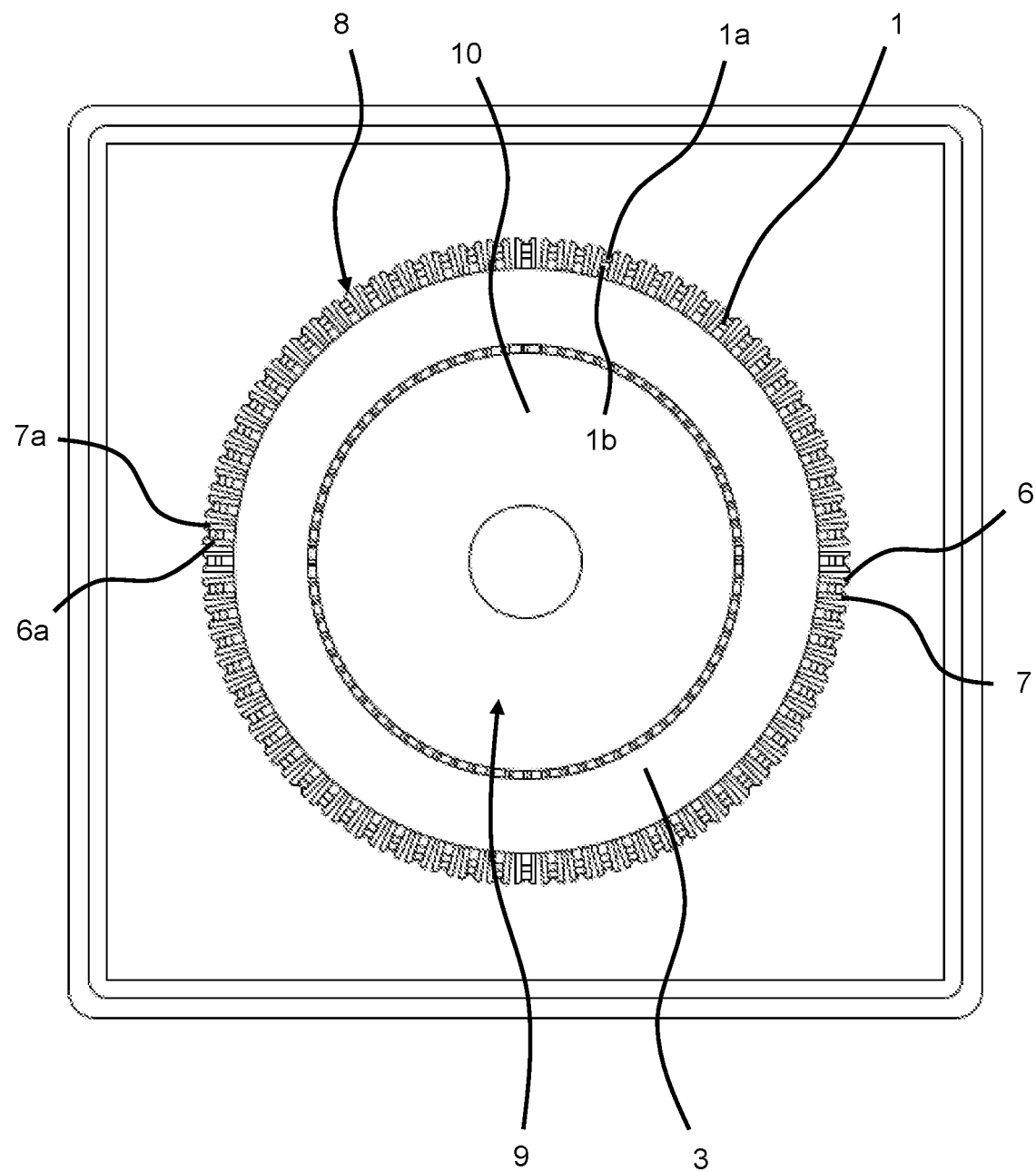
Figure 10A:
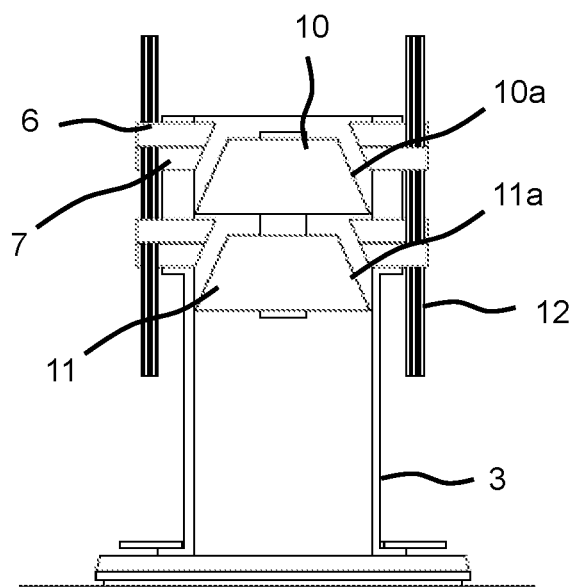
FIG. 10A-10B are a schematic depiction of the workpiece carrier of the device from FIG. 1, wherein a plurality of layers for the arrangement of coil elements is produced.
Figure 10B:
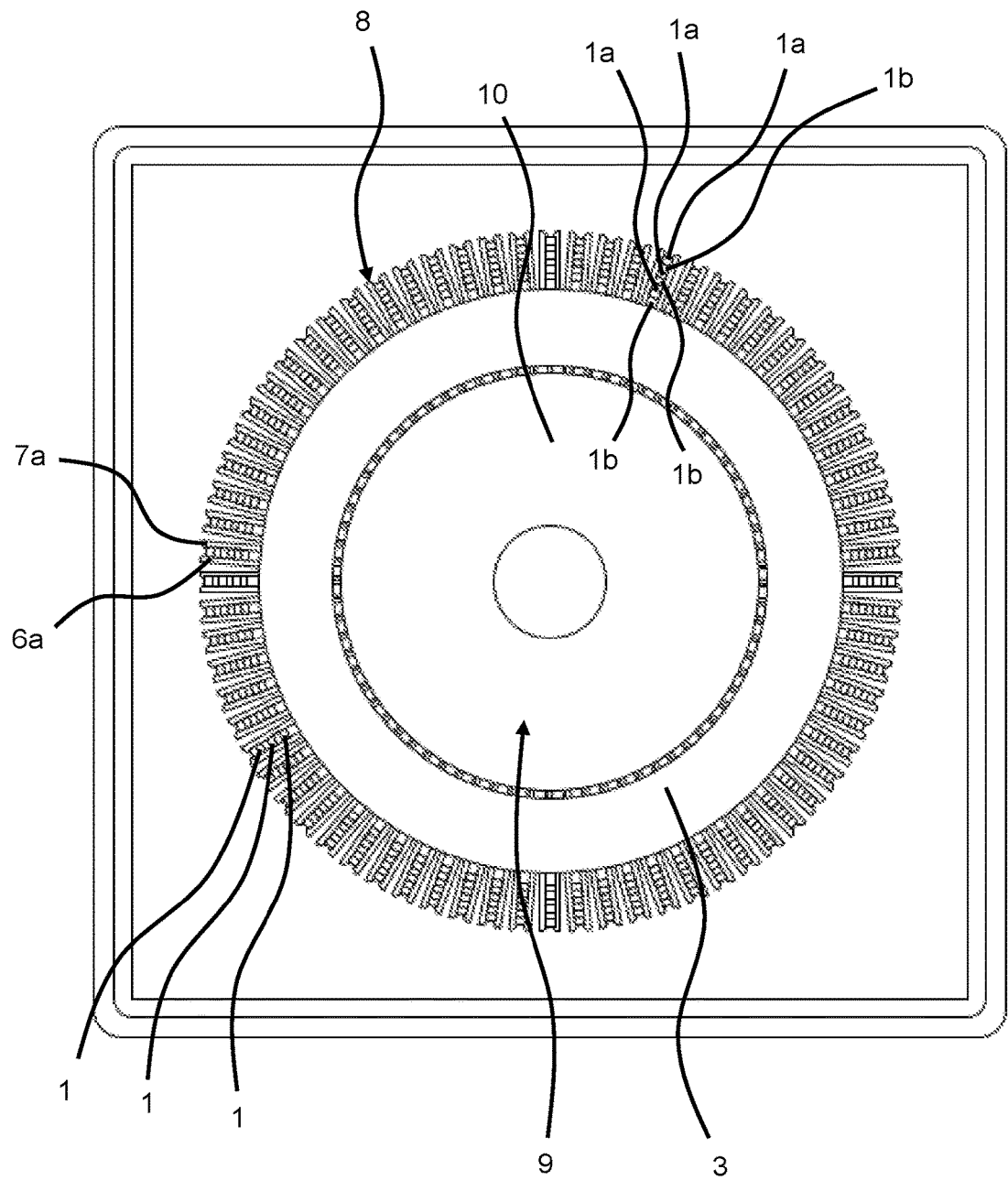
Figure 11A:
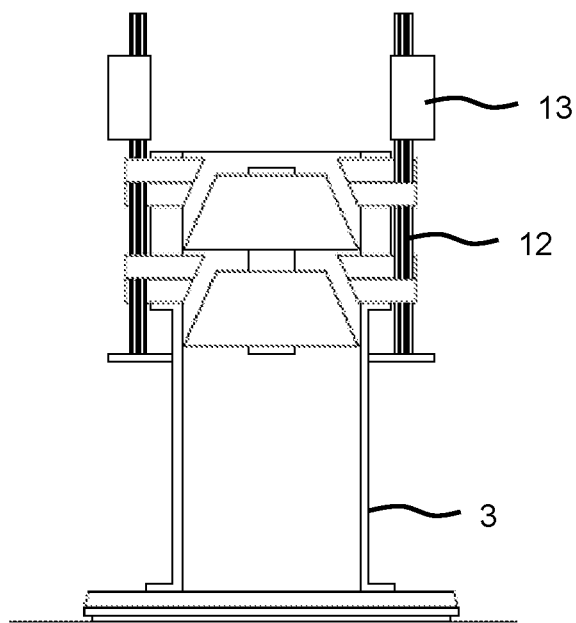
FIG. 11A-11B are a schematic depiction of the workpiece carrier from FIG. 10, wherein the arrangement of coil elements is gripped using a transfer gripping device.
Figure 11B:
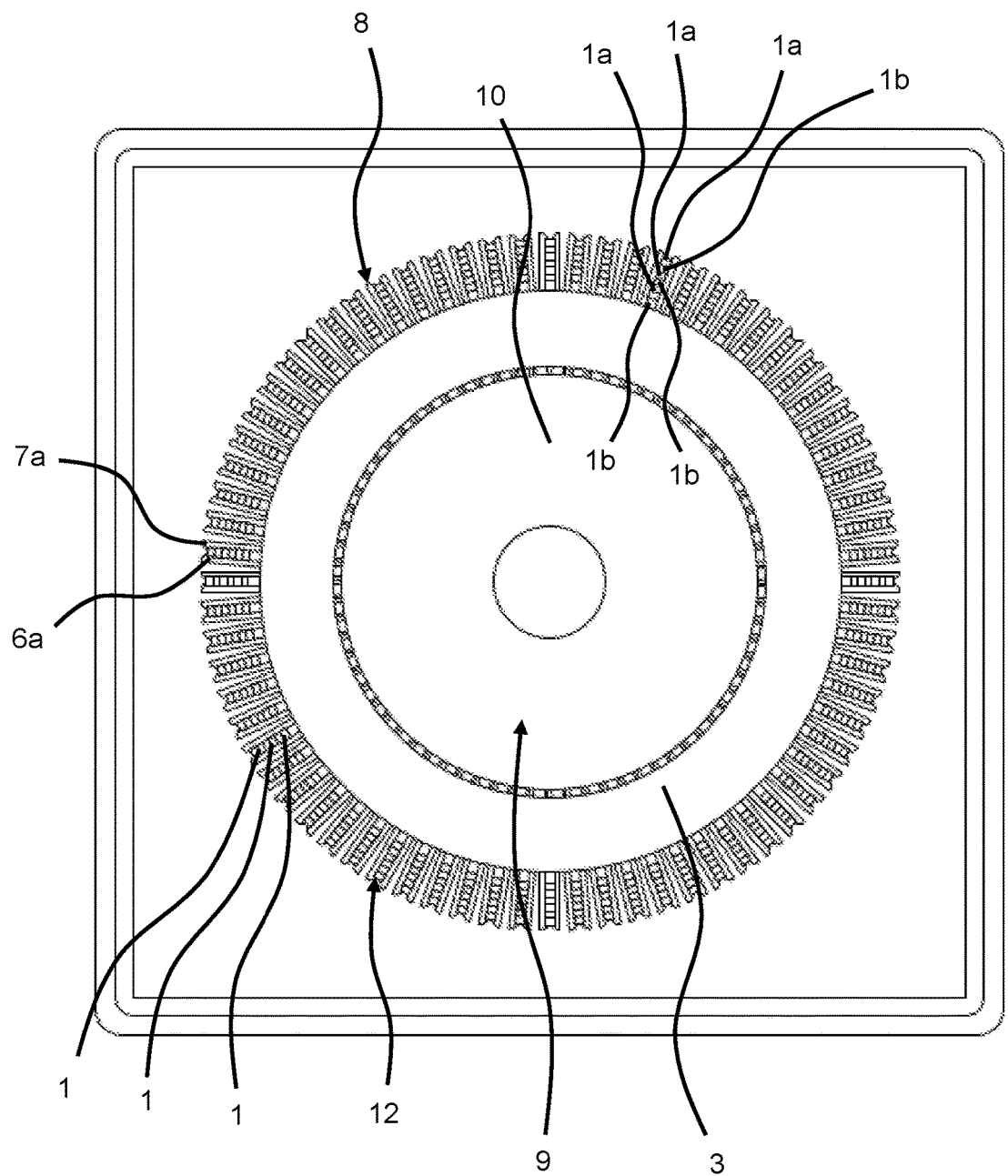
Figure 12A:
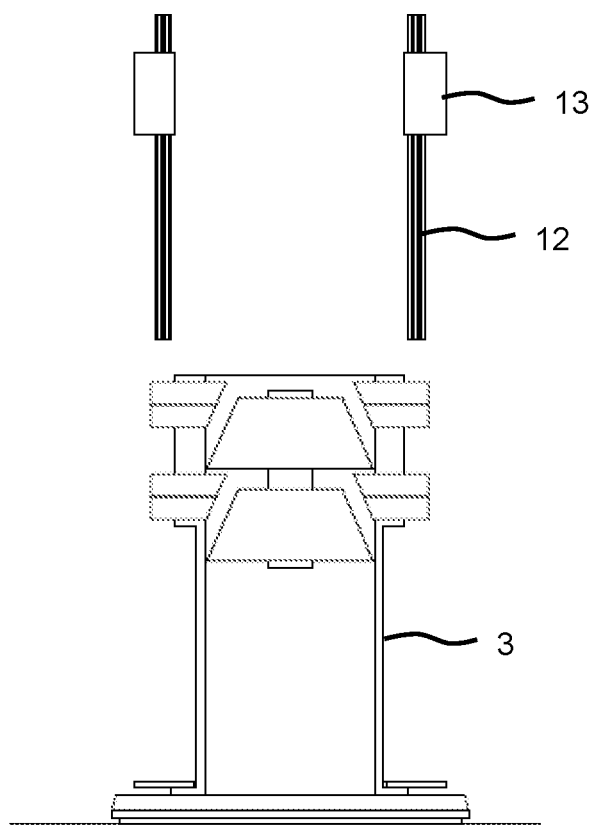
FIG. 12A-12B are a schematic depiction of the workpiece carrier from FIG. 10, wherein the arrangement of coil elements is removed from the workpiece carrier by means of the transfer gripping device.
Figure 12B:
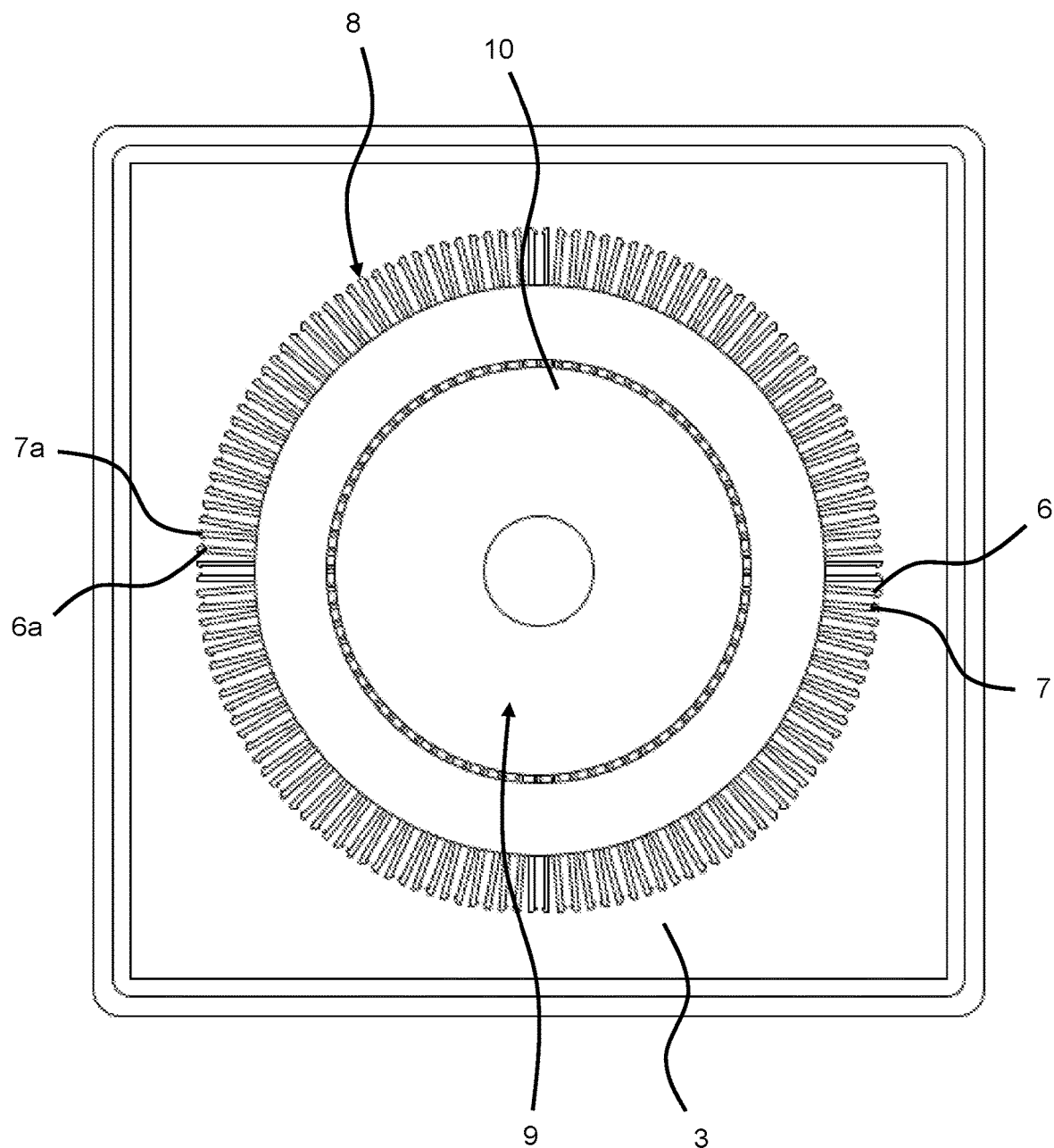

According to FIGS. 9A-9B, the displacement device 2 and the pressing device 5 may then be farther displaced into the elevated position with respect to the workpiece carrier 3, in order to, for example, again accommodate a respective coil element 1 and supply the same for the production of the arrangement of coil elements 1 at the workpiece carrier 3, so that a multi-layer arrangement 12 of coil elements 1 may be produced, as this is shown in FIGS. 10A-10B.

With the aid of a transfer gripper 13, the multi-layer arrangement 12 of coil elements 1 is received and released from the workpiece carrier 3 according to FIGS. 11A-11B and 12A-12B, wherein the arms 1a, 1b of the coil elements 1 are hereby guided out of the gripping device 8, for example, in that a frictional force between the coil element 1 and the gripping elements 6, 7 is sur-mounted. To release the coil elements 1 from the gripping device 8, it may be provided that the clamping force, which is exerted on the coil elements 1 by the gripping elements 6, 7, is reduced in order to facilitate the release.

Figure 13:
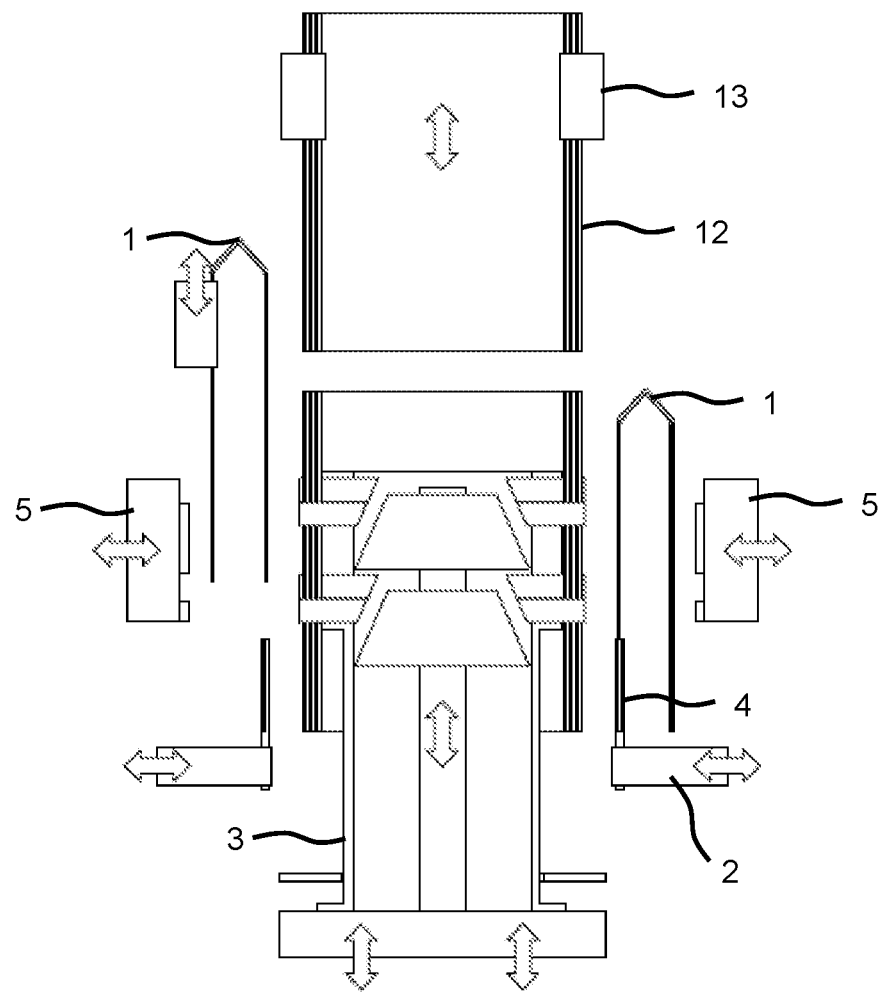
FIG. 13 a schematic depiction of another device for producing an arrangement of coil elements for a plug-in coil of an electric machine.

FIG. 13 shows a schematic depiction of another device for producing an arrangement of coil elements 1 for a plug-in coil of an electric machine. The same reference numerals are used for the same features in FIG. 13 as are used in FIGS. 1A-1B to 12A-12B. The device has a stationary design, which may be used, for example, for lower production numbers of arrangements of coil elements.

The features disclosed in the preceding description, the claims, and the drawing may be of importance individually and also in any combination for the implementation of the different embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. Method for producing an arrangement of coil elements for a plug-in coil of an electric machine, comprising:
   providing a workpiece carrier having a plurality of gripping devices; and
   producing an at least single-layer arrangement of rod-shaped coil elements for a plug-in coil of an electric machine on the workpiece carrier, by:
   accommodating and holding each of the coil elements by means of a respective displacement device of a set of displacement devices;
   supplying the coil elements onto the workpiece carrier by means of the set of displacement devices into an assigned proximal position on the workpiece carrier, wherein the coil elements are hereby displaced from a distal position into the assigned proximal position with respect to the workpiece carrier; and
   while in the assigned proximal position on the workpiece carrier, transferring the coil elements from the set of displacement devices to the workpiece carrier using the plurality of gripping devices;
   wherein, after the transferring of the coil elements, the at least single-layer arrangement of coil elements is held on the workpiece carrier by means of the plurality of gripping devices.

2. Method according to claim 1, wherein each gripping device in the plurality of gripping devices is designed with gripping elements which grip and hold the coil elements during the transferring of the same.

3. Method according to claim 1, wherein each gripping device in the plurality of gripping devices is displaced by a respective displacement device between a retracted and an extended position, in which the transferring of the coil elements is carried out.

4. Method according to claim 3, wherein each gripping device in the plurality of gripping devices is displaced at least in sections into an opening of a wall section of the workpiece carrier during the displacement.

5. The method according to claim 3, wherein each gripping device in the plurality of gripping devices is displaced between the retracted and the extended position by means of a thereon functionally coupling actuating device, which is arranged on the workpiece carrier.

6. Method according to claim 1 wherein each gripping device in the plurality of gripping devices has a respective locking device which is configured to prevent an unintentional release of the coil elements after the transferring.

7. Method according to claim 1 wherein during transferring the coil elements from the set of displacement devices to the workpiece carrier, a relative movement is carried out between the coil elements and the plurality of gripping device in a direction radially inward to the workpiece carrier.

8. Method according to claim 1 wherein during the supply of the coil elements onto the workpiece carrier, the displacement devices with the coil elements held thereon are displaced in the direction radial to a workpiece carrier axis in order to displace the coil elements into the proximal position on the workpiece carrier.

9. Method according to claim 1 wherein in the proximal position, the coil elements are pivoted about an axis of rotation after the displacement into the proximal position.

10. Method according to claim 1 further includes pressing the coil elements into the plurality of gripping devices by means of a pressing device after the step of transferring the coil elements.

11. Device for producing an arrangement of coil elements for a plug-in coil of an electric machine, comprising:
    a workpiece carrier on which at least a single-layer arrangement of rod-shaped coil elements for a plug-in coil of an electric machine is producible, wherein the workpiece carrier includes a plurality of gripping devices;
    a set of displacement devices, each displacement device in the set of displacement devices is configured to accommodate and hold a respective coil element from the at least single-layer arrangement of coil elements;
    each displacement device in the set of displacement devices is further configured to supply the respective coil element onto the workpiece carrier in such a way that the respective coil element is displaced from a distal position to an assigned proximal position with respect to the workpiece carrier;
    wherein the plurality of gripping devices are configured to transfer and hold the at least single-layer arrangement of coil elements on the workpiece carrier.

* * * * *